US007442290B2

(12) United States Patent
Shan et al.

(10) Patent No.: US 7,442,290 B2
(45) Date of Patent: Oct. 28, 2008

(54) MESOPOROUS ALUMINUM OXIDE, PREPARATION AND USE THEREOF

(75) Inventors: Zhiping Shan, Bloomfield, NJ (US); Jacobus Cornelius Jansen, Delft (NL); Chuen Y. Yeh, Edison, NJ (US); Philip J. Angevine, Woodbury, NJ (US); Thomas Maschmeyer, Delft (NL)

(73) Assignee: Lummus Technology Inc., Bloomfield, NJ (US)

( * ) Notice: Subject to any disclaimer, the term of this patent is extended or adjusted under 35 U.S.C. 154(b) by 0 days.

(21) Appl. No.: 11/726,294

(22) Filed: Mar. 21, 2007

(65) Prior Publication Data
US 2007/0170096 A1 Jul. 26, 2007

Related U.S. Application Data

(62) Division of application No. 10/795,771, filed on Mar. 8, 2004, now Pat. No. 7,211,238.

(60) Provisional application No. 60/454,207, filed on Mar. 12, 2003.

(51) Int. Cl.
| C10G 35/04 | (2006.01) |
| C10G 69/00 | (2006.01) |
| C10G 47/02 | (2006.01) |
| C10G 33/00 | (2006.01) |
| C10G 45/00 | (2006.01) |
| C07C 5/02 | (2006.01) |
| C07C 5/32 | (2006.01) |
| C07C 5/22 | (2006.01) |
| C01B 17/02 | (2006.01) |
| C01B 3/38 | (2006.01) |

(52) U.S. Cl. ............... 208/46; 208/66; 208/108; 208/133; 208/134; 208/187; 208/208 R; 208/254 R; 585/251; 585/252; 585/253; 585/361; 558/319; 518/700; 423/651; 423/652; 423/653; 423/654; 423/573.1; 252/373

(58) Field of Classification Search .............. 208/46, 208/66, 108, 133, 134, 187, 208 R, 254 R; 585/251, 252, 253, 361; 558/319; 518/700; 423/651, 652, 653, 654, 573.1; 252/373
See application file for complete search history.

(56) References Cited

U.S. PATENT DOCUMENTS

| 4,677,093 | A | * | 6/1987 | Devanneaux et al. ........ 502/220 |
| 5,098,684 | A | | 3/1992 | Kresge et al. |
| 5,102,643 | A | | 4/1992 | Kresge et al. |
| 5,622,684 | A | | 4/1997 | Pinnavaia et al. |
| 5,672,556 | A | | 9/1997 | Pinnavaia et al. |
| 5,837,131 | A | * | 11/1998 | Clark ................... 208/216 PP |
| 5,863,515 | A | | 1/1999 | Davis et al. |
| 6,027,706 | A | | 2/2000 | Pinnavaia et al. |
| 6,146,602 | A | | 11/2000 | Narula et al. |
| 6,197,276 | B1 | | 3/2001 | Kolenda et al. |
| 6,214,312 | B1 | | 4/2001 | Kolenda et al. |
| 6,342,293 | B1 | | 1/2002 | Nakahara et al. |
| 6,358,486 | B1 | | 3/2002 | Shan et al. |
| 6,410,473 | B1 | | 6/2002 | Pinnavaia et al. |
| 6,696,258 | B1 | | 2/2004 | Wei et al. |
| 6,814,950 | B1 | | 11/2004 | Shan et al. |
| 2006/0009666 | A1 | * | 1/2006 | Ramachandran et al. ..... 585/258 |

FOREIGN PATENT DOCUMENTS

WO WO 00/15551 3/2000

OTHER PUBLICATIONS

Huo et al., *Generalized Synthesis of Periodic Surfactant/Inorganic Composite Materials*, Nature, 368, 317-321 (1994).
Tanev et al., *A Neutral Templating Route to Mesoporous Molecular Sieves*, Science, vol. 267, 865-867, (1995).
Jansen, et al., *A New Templating Method for Three-Dimensional Mesopore Networks*, Chem. Commun., 713-714 (2001).
Bagshaw et al., *Templating of Mesop[orous Molecular Sieves by Nonionic Polyethylene Oxide Surfactants*, Science, vol. 269, 1242-1244 (1995).
Vaudry, et al., *Synthesis of Pure Alumina Mesoporous Materials*, Chem. Mater. 8, 1451-1464 (1996).
Cabrera et al., *Surfactant-Assisted Synthesis of Mesoporous Alumina Showing Continuously Adjustable Pore Sizes*, Adv. Mater. vol. 11, No. 5, 379-381 (1999).
Kim et al., *Ion Exchange and Thermal Stability of MCM-41*, J. Phys. Chem., 1995, vol. 99, No. 45, 16742-16747 (1995).
Barrer, *Zeolites and their synthesis*, Zeolites, vol. 1, pp. 130-140 (Oct. 1981).

(Continued)

Primary Examiner—Timothy C Vanoy
(74) Attorney, Agent, or Firm—Dilworth & Barrese, LLP

(57) ABSTRACT

Mesoporous aluminum oxides with high surface areas have been synthesized using inexpensive, small organic templating agents instead of surfactants. Optionally, some of the aluminum can be framework-substituted by one or more other elements. The material has high thermal stability and possesses a three-dimensionally randomly connected mesopore network with continuously tunable pore sizes. This material can be used as catalysts for dehydration, hydrotreating, hydrogenation, catalytic reforming, steam reforming, amination, Fischer-Tropsch synthesis and Diels-Alder synthesis, etc.

9 Claims, 12 Drawing Sheets

OTHER PUBLICATIONS

Davis et al., *A molecular sieve with eighteen-membered rings*, Nature, vol. 331, pp. 698-699 (Feb. 1988).

Davis et al., *Zeolite and Molecular Sieve Synthesis*, Chem. Mater., vol. 4, pp. 756-768 (1992).

Gies et al., *The structure-controlling role of organic templates for the synthesis of porosils in the system $SiO_2$/template/$H_2O$*, Zeolites, vol. 12, pp. 42-49 (Jan. 1992).

Hearmon et al., *The protonation state of adamantanamine template after high-silica zeolite synthesis, studied by $^{13}C$ solid-state n.m.r.*, Zeolites, vol. 10, pp. 608-611 (Jul./Aug. 1990).

Beck et al., *A New Family of Mesoporous Molecular Sieves Prepared with Liquid Crystal Templates*, J. Am. Chem. Soc., vol. 114, pp. 10834-10843 (1992).

\* cited by examiner

XRD pattern of mesoporous alumina in Example 1

Pore size distribution of the material in Example 1.

27Al NMR of mesoporous alumina in Example 1

XRD patterns of mesoporopus alumina in Examples 2-6

A TEM (Transmission Electronic Microscopy) image of mesoporous alumina in Example 3

$^{27}$Al NMR of mesoporous alumina in Example 8

$^{27}$Al NMR of mesoporous alumina in Example 11

XRD pattern of mesoporous alumina in Example 13

XRD pattern of mesoporous alumina in Example 14

Nitrogen adsorption and desorption isotherms for the mesoporous alumina in Example 14.

Pore size distribution of mesoporous alumina in Example 14

$^{27}$Al NMR of mesoporous alumina in Example 14

XRD pattern of mesoporous alumina in Example 15

MESOPOROUS ALUMINUM OXIDE, PREPARATION AND USE THEREOF

CROSS REFERENCE TO RELATED APPLICATIONS

The present application is a divisional of U.S. application Ser. No. 10/795,771 which was filed on Mar. 8, 2004 now U.S. Pat. No. 7,211,238 and which claims priority to U.S. provisional application Ser. No. 60/454,207, filed Mar. 12, 2003, both of which are incorporated by reference herein.

BACKGROUND

1. Technical Field

This invention relates to mesostructured, amorphous aluminum oxide materials with three-dimensionally, randomly connected framework mesopores and methods for synthesizing these materials and the utilization of the said materials. In particular, the present invention relates to such materials where the mesoporous structure is formed via a reorganization process by heating a homogeneous synthesis mixture consisting of alumina species and organic pore-forming agents. The present invention further relates to processes using the said materials as catalysts and/or catalyst supports and adsorbents, particularly in refinery and petrochemical processes.

2. Description of Related Art

Zeolites are highly crystalline microporous aluminosilicates widely used in industry, particularly in petroleum refining and petrochemical processing. Zeolites and some other molecular sieves, e.g. aluminophosphates and pillared clays, have rigorously uniform pore sizes. Depending upon the pore size distribution, porous solid materials are classified as microporous (pore sizes<2 nm), mesoporous (pore sizes between 2 and 50 nm) and macroporous (pore sizes>50 nm).

Many inorganic porous materials are synthesized based on the interaction of organic templates and inorganic species. Individual organic molecules have been used for the templating of micropores for about 40 years. The organic template normally has three functions: filling voids, balancing charges, and stabilizing structural building units. The templating mechanisms and crystallization of zeolites have been documented (Barrer et al., Zeolites, 1, 130-140 (1981); Davis et al;, Nature, 331, 698-699 (1988); Davis et al., Chem. Mater., 4, 756-768 (1992) and Gies et al., Zeolites, 12, 42-49 (1992); Hearmon et al., Zeolites, 10, 608-611 (1990)).

One drawback to the use of zeolites as catalysts is that their relatively small pore sizes prevent some bulky, important chemicals from entering the pores of the zeolite and being chemically converted. Thus,-there is an increasing demand for novel, mesoporous materials, particularly those that can be used as catalysts, catalyst carriers, or adsorbents.

The use of surfactants, such as long chain, quaternary alkyl ammonium cations, is known to be successful in templating mesoporous materials, such as mesoporous silica and aluminosilicate (cf. U.S. Pat. Nos. 5,098,684 and 5,102,643, the contents of each of which are incorporated by reference herein). Further studies have proposed a pore formation mechanism for these reactions, which involve strong electrostatic interactions and ion pairing between surfactants and anionic silicate species (Beck et al., J. Am. Chem. Soc., 114, 10,834-10,843 (1992)). This concept has been further developed with the suggestion of four complementary synthesis pathways, implying that both cationic and anionic surfactants can be used. (Huo et al., "Generalized Synthesis of Periodic Surfactants/Inorganic Composite Materials", Nature, 368, 317-321 (1994).) In addition, one study recently used neutral primary amines or polyethylene oxide to form micelles, which interact with inorganic species via hydrogen bonding (Tanev et al. "A Neutral Templating Route to Mesoporous Molecular Sieves", Science, Vol. 267, 865-867, (1995)). In all the above methods, surfactants are used to form micelles, which are then capable of templating mesopores.

More recently, the use of small, inexpensive organic molecules as templates has been disclosed to synthesize three-dimensional and stable microporous and mesoporous silicates in the absence of any surfactants (cf. WO 00/15,551 and U.S. Pat. No. 6,358,486, the contents of each of which are incorporated by reference herein). In the process of mesopore formation, no micelles were formed, but organic aggregates of small template molecules formed in a homogeneous, inorganic matrix upon heating as described by Jansen, et al., "A New Templating Method for Three-Dimensional Mesopore Networks", Chem. Common., 713-714 (2001).

Previous methods of synthesizing mesoporous aluminum oxides have employed neutral polyethylene oxides as templates (U.S. Pat. Nos. 5,622,684 and 6,027,706; Bagshaw et al., Science. vol. 269, 1242-1244 (1995)); carboxylic acids as templates, where the pore sizes of the resulting materials could not be adjusted (U.S. Pat. No. 5,863,515; Vaudry, et al., "Synthesis of Pure Alumina Mesoporous Materials". Chem. Mater. 8, 1451-1464 (1996)); and a surfactant-assisted synthesis using chelating agents to control hydrolysis and condensation (Cabrera et at., "Surfactant-Assisted Synthesis of Mesoporous Alumina Showing Continuously Adjustable Pore Sizes", Adv. Mater. vol. 11, No. 5, 379-381 (1999)). However, all these methods are based on the self-assembly of surfactants to form micelles, and it is often difficult to adjust the porosity of the resulting materials.

Accordingly, there remains a need for improved inorganic aluminum materials, such as mesoporous aluminum oxides, which can be used as catalysts, catalyst supports, or adsorbent materials, that possess thermal-stable, three-dimensional pore systems.

There also remains a need for new methods to synthesize mesoporous aluminum oxides with highly thermal-stable, three-dimensional pore systems, where the methods are both economical and permit the adjustment of mesopore sizes.

SUMMARY OF THE INVENTION

This invention provides a new and highly stable, mesoporous aluminum oxide composition, denoted as "Al-TUD-1" with three-dimensionally, randomly connected pores. Furthermore, this invention provides a new and simple synthesis route that is cost-effective using inexpensive, small organic molecules as pore-forming agents or templates, instead of surfactants. The new methods of synthesis allow one to continuously adjust mesopore size, pore volume and surface area. Preferably, this is accomplished by no subjecting the composition to a hydrothermal treatment. e.g., by placing it in an autoclave.

In one embodiment, an organic aluminum source is utilized in the synthesis of the mesoporous aluminum oxide. In another embodiment, an inorganic aluminum source is utilized. Preferably, where an inorganic aluminum source is utilized, an alkali is added to adjust the pH of the synthesis mixture. The material may be optionally aged and dried, and the pore-forming agent is removed by conventional methods, such as calcination or solvent extraction.

The new synthesis route of the present invention is easy to operate and scale up, leading to feasible synthesis in industry. The new synthesis route produces novel mesoporous aluminum oxide compositions.

This invention further provides processes to utilize the said mesoporous Al-TUD-1 in many hydrocarbon and derivative processes, particularly in refinery and petrochemical processes.

DETAILED DESCRIPTION OF THE INVENTION

Figure 1:
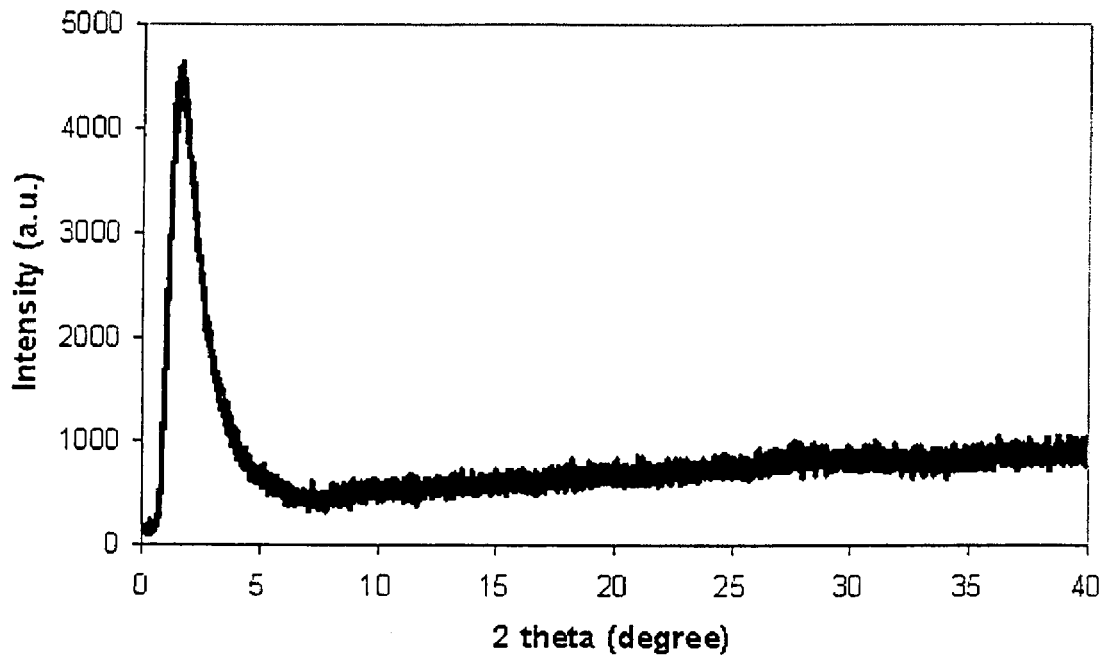
FIG. 1 is an X-ray diffraction pattern of mesoporous alumina produced in Example 1.

Aluminum oxides have been widely used in industry as catalyst or catalyst supports, but they do not have regular framework-confined mesopores. Stable mesoporous aluminum oxides are needed in industry as catalysts, catalyst supports and/or adsorbents due to their high surface areas and large pore volumes. The present invention provides a highly stable mesoporous aluminum oxide with continuously adjustable or tunable mesopores. Furthermore, the mesopores are three-dimensionally and randomly connected, which will facilitate the reactant's and product's diffusion in catalytic applications.

The present invention also relates to novel methods for the synthesis of these mesostructured amorphous aluminum oxide materials possessing three-dimensionally and randomly connected framework mesopores. The mesoporous structure is formed in the aluminum oxide materials of the present invention via a reorganization process by heating a homogeneous synthesis mixture consisting of aluminum species and organic pore-forming agents.

Some features of the synthesis route, which are improvements over those found in the prior art, include: (a) use of inexpensive, small organic chemicals as pore-forming agents instead of surfactants; (b) no micelles formed in the mesopore templating process, whereas most other mesoporous materials are synthesized based on micelle formation; (c) the mesoporosity of the aluminum oxide can be easily and continuously adjusted; and (d) possible to use inexpensive inorganic aluminum sources.

In one embodiment of the present invention, the new synthesis process for mesoporous aluminum oxide comprises the following:
(a) dissolving an organic aluminum source (e.g., aluminum alkoxides) alone or together with a framework-substituted element in a solvent;
(b) adding at least one pore-forming agent to the mixture;
(c) adding a solvent to the mixture;
(d) optionally ageing the mixture at a temperature ranging from about 10° C. to about 90° C. for a period of time ranging from about 0 to about 48 hours;
(e) drying the mixture at a temperature ranging from about 40° C. to about 140° C. for a period of time ranging from about 2 to about 48 hours to obtain a dried gel;
(f) optionally heating the dried gel in an autoclave at a temperature ranging from about 80° C. to about 200° C. for a period of time ranging from about 0 to about 96 hours; and
(g) removing the pore-forming agent, preferably by conventional methods such as calcination or solvent extraction.

Many types of aluminum sources may be used to synthesize the mesoporous aluminum oxides disclosed in the present invention. Various aluminum sources are suitable, including, but not limited to, those containing organic groups such as aluminum alkoxides, most inorganic aluminum salts, and some amorphous aluminum oxides such as aluminum oxide sol and aluminum hydroxide gel. Suitable aluminum alkoxides include, but are not limited to, aluminum isopropoxide, aluminum ethoxide and aluminum butoxide. Other metals, including, but not limited to, Si, Ga, B, P, S, La, Ce, Ti, Fe, Ni, Mo, Co, Cr, Mg, Zn, Sn, V, W, Ru, Pt, Pd. In, Mn and Cu, may be added to substitute Al in the resulting framework.

Compared with the surfactants previously used in forming porous inorganic oxides, the organic pore-forming agents used in the methods of the present invention are inexpensive and are commercially available in large quantities. Preferably, the organic pore-forming agent is one of a group of small organic chemicals with boiling points greater than about 180° C. at atmospheric pressure, more preferably, having at least one heteroatom selected from nitrogen, oxygen and sulfur.

The heteroatom, when present, may result in intramolecular hydrogen-bonding interaction among the pore-forming agents. The heteroatoms may also undergo certain interactions with inorganic species, such as hydrogen-bonding interaction or coordination. Suitable pore-forming agents include, for example, tetraethylene glycol, triethanolamine, triisopropanolamine, triethylene glycol, sulfolane, and diethylglycoldibenzoate.

During the synthesis process, the aluminum source and organic pore-forming agent are heated. As a result, meso-sized organic aggregates are formed, which act as templates for the aluminum oxide framework and result in the formation of framework-confined mesopores in the aluminum oxide. The unique synthesis methods of the present invention provide tunable mesopore sizes in the aluminum oxide framework, which may be easily adjusted by varying the heating time and temperature. The pore-forming agents may then be removed by conventional methods such as calcination or, more preferably, through solvent extraction. The resulting mesoporous aluminum oxide may be used as a catalyst, catalyst carrier, or adsorbent.

Preferably, the molar ratio of pore-forming agent to aluminum in the aluminum source is from about 0.1 to about 2.0, more preferably from about 0.5 to about 1.5.

Suitable solvents used in the synthesis procedures include, but are not limited to, water; alcohols, including isopropanol, ethanol and propanol; ketones, including acetone; ethers; esters, including ethyl acetate; and mixtures of one or more thereof.

The mixture may be optionally aged at a temperature ranging from about 10° C. to about 90° C. for a period of time ranging from about 0 to about 48 hours.

During the drying step, the material may be gradually heated to obtain a high integrity product. It is preferred to achieve a homogeneous heating rate, which may be achieved by maximizing the heat transfer surface area of the gel during the evaporation, e.g., by using shallow beds, breaking up the solid phase after drying, or by using rotary evaporators. During this drying stage, the organic pore-forming agents that aid in forming the mesopores are generally not removed from the system to a substantial degree, as they preferably have a boiling point above, at least, about 180° C. The drying may take, for example, from about 2 hours to about 48 hours.

After sufficient heating, the pore-forming agent can be removed by conventional methods, including calcination and solvent extraction. When calcination is utilized, the material is heated to a calcination temperature, for example, temperatures of from about 300° C. to about 1000° C., preferably at least about 400° C. and maintained at such temperature for a time sufficient to effect such calcination of the material. To prevent hot spots, the heating rate should be sufficiently low and the height of the sample bed should no be limited. The heating rate during calcination preferably ranges from about 0.1° C./minute to about 25° C./minute, more preferably from about 0.5° C./minute to about 10° C./minute. and most preferably from about 0.8° C./minute to about 5° C./minute.

Where utilized, the solvent extraction will take the pore-forming agent out from the dried synthesis mixture by contacting the dried mixture with one or more organic solvents at a sufficient temperature for a sufficient period of time. Suitable solvents include, but are not limited to, alcohols, ethers, esters and ketones, preferably ethanol, isopropanol, propanol, ether, acetone and ethyl acetate. Preferably, the extraction takes place at temperatures ranging from about 30° C. to about 150° C., more preferably from about 50° C. to about 120° C., mainly depending on the boiling point of the solvents used. Preferably, the extraction takes place for a period of time ranging from about 3 hours to about 120 hours, more preferably from about 6 hours to about 96 hours.

In some embodiments, the material may be subjected to hydrothermal treatment (i.e., heating in a sealed autoclave) after drying and prior to removal of the pore-forming agent, e., in a sealed vessel at autogenous pressure and at temperatures above about 80° C. and which generally do not exceed about 250° C. Preferably, the material is heated to a temperature ranging from about 80° C. to about 200° C. for a period of time ranging from about 0 to about 96 hours. The size of the mesopores in the final product may be influenced by the length and temperature of this hydrothermal step. In general, in the final product the percentage of mesopores increase with increasing temperature and increasing duration of the hydrothermal treatment.

The synthesis route may be changed, especially when the aluminum sources are inorganic sources such as salts that are acidic in aqueous solution. Such salts include, but are not limited to, aluminum nitrate, aluminum chloride, aluminum sulfate, aluminum perchlorate and aluminum acetate. Consequently, the addition of a base to the synthesis mixture may be necessary to adjust the pH of the synthesis mixture. These bases may be either inorganic or organic alkalis. Preferable inorganic bases include, but are not limited to, sodium hydroxide, sodium carbonate, ammonia, ammonium hydroxide and ammonium carbonate. Preferable organic bases include, but are not limited to, tetra alkyl ammonium hydroxides, tetra alkyl ammonium halides, tetra alkyl ammonium nitrates, urea, and substituted ureas. The pH value of the final synthesis mixture before drying ranges from 6 to 13. Where bases are added, new salts (e.g., $Na_2SO_4$) may be produced during the synthesis and should be removed by washing the calcined aluminum oxide with water.

In such a case a new synthesis route comprises:
(a) dissolving at least one inorganic aluminum source alone or together with a framework-substituted element in a solvent;
(b) adding at least one pore-forming agent to the mixture;
(c) adding a certain amount of water or a solvent and alkali (e.g., NaOH or $NH_4OH$) to the mixture;
(d) optionally ageing the mixture at a temperature ranging from about 10° C. to about 80° C. for a period of time ranging from about 0 to about 96 hours;
(e) drying the mixture at a temperature ranging from about 40° C. to about 140° C. for a period of time ranging from about 1 to about 48 hours to obtain a dried gel;
(f) optionally heating the dried gel in an autoclave at a temperature ranging from about 80° C. to about 200 ° C. for a period of time ranging from about 0 to about 96 hours;
(g) removing the pore-forming agent, preferably by conventional methods, such as calcination or solvent extraction, to obtain a powder;
(h) washing the powder using water to remove salts generated during the preparation; and
(i) drying the powder at a temperature ranging from about −20° C. to about 120° C.

In some cases the new salts (e.g., $NH_4NO_3$) may be removed by calcination, so washing step (h) and drying step (i) are not required. In this case, the synthesis process comprises steps from (a) to (g) without steps (h) and (i), even where inorganic aluminum sources are used.

Suitable inorganic aluminum sources include, but are not limited to, aluminum salts such as aluminum nitrate, aluminum chloride, aluminum sulfate, aluminum perchlorate, and aluminum acetate. As noted above, other elements including, but not limited to, Si Ga, B, P, S, La, Ce, Ti, Fe, Ni, Mo, Co, Cr, Mg, Zn, Sn, V, W, Ru, Pt, Pd, In, Mn and Cu may be mixed with the at least one inorganic aluminum source.

Suitable solvents used in the synthesis procedures include, but are not limited to, water; alcohols, including isopropanol, ethanol and propanol; ketones, including acetone; ethers: esters, including ethyl acetate: mixtures of one or more thereof; and mixtures of one or more thereof with water.

The present invention also includes a process for adjusting the mesopore sizes in a mesoporous aluminum oxide. This process includes the steps of preparing a mixture comprising at least one aluminum species and at least one pore-forming agent, drying the mixture at a temperature ranging from about 40° C. to about 140° C. for a period of time ranging from about 1 to about 48 hours to obtain a dried gel, heating the dried gel in an autoclave at a temperature ranging from about 80° C. to about 200° C. for a period of time ranging from about 1 to about 120 hours, and removing the pore-forming agent.

The same pore-forming agents described above may be used in the process for adjusting the mesopore sizes in a mesoporous aluminum oxide, preferably organic compounds having a boiling point higher than 180° C. at atmospheric pressure. Compounds having at least one hydroxyl (—OH) group may also be used. In addition, compounds having at least one nitrogen atom may be used. Suitable pore-forming agents include, for example, tetraethylene glycol, triethanolamine, triisopropanolamine. triethylene glycol, sulfolane, and diethylglycoldibenzoate.

In all processes described above, the order of the steps from (a) to (c) in the preparation of a synthesis mixture may be chanced. In other words, the compound utilized, including aluminum sources, framework-substituted elements, pore-forming agents, solvents, and alkalis, if applicable, may be mixed together in random order.

In addition, in all processes described above, the step of ageing the synthesis mixture and the step of heating the dried gel in an autoclave (hydrothermal treatment) are optional; however, in some embodiment these steps are preferably included. The ageing process will complete the hydrolysis and polycondensation of aluminum species, especially when organic aluminum sources are used. As described above, the length and temperature of any additional heating step (hydrothermal treatment) influences the size of the mesopores in the final product.

No surfactants are used in the processes described above, and the molar ratio of pore-forming agent to aluminum in the synthesis mixture can range from about 0.1 to about 2.0, preferably from about 0.5 to about 1.5.

In accordance with the present invention mesopore sizes in the aluminum oxide framework, surface areas, and pore volumes may be adjusted by varying the temperature and time of heating the gel obtained after drying. The mesopore is templated by the aggregates of the pore-forming agents, and the mesopore sizes are determined by the size of the aggregates. Upon heating, the organic aggregates start to form and may be enlarged with an increase in both the temperature and time of heating. Accordingly, the present invention offers an easily tuned mesoporosity by heating the dried gel at different temperatures and for different periods of time.

As a result of the above novel processes, novel mesoporous aluminum oxides are produced, as demonstrated by, for example, their x-ray diffraction patterns, pore diameters, pore volumes, and surface areas. The resulting aluminum oxide material has interconnected mesopores, i.e., pores having a pore diameter ranging from about 1.5 to about 20 nm. The mesopores are interconnected, and may take the form of a sponge-like structure with randomly, three-dimensionally connected pores.

The composition of this invention shows at least one intensive peak ranging from about 0.3 to about 3.5° in 2θ (theta) in an X-ray diffraction (XRD) pattern, indicating the existence of meso-structure. As used herein, "mesostructure" or "meso-structured" refers to a structure of the composition having a regular pattern or a repeating unit in meso-sized scale, or the structure has a long-range ordering in meso-sized scale from about 2 nm to about 50 nm. The presence of one peak means that the material has an extremely regular structure, without being crystalline. The regular structure is determined by a distribution of wall thicknesses, in combination with a narrow size distribution of the sizes of the mesopores. The wall-to-wall distance of the mesopores or the basal spacing will preferably range from about 2.5 nm to about 30 nm.

An important advantage of the materials of the present invention is the hydrothermal stability thereof. It has been found that the material is more stable than standard mesoporous materials, such as MCM-41 of Mobil. This stability is determined in terms of a decrease of intensity of the most important peak in XRD, pore volume and pore size after treatment of the material in boiling water, for example, for about 2 hours. For example, after calcination at about 900° C. for about 2 hours in air, the X-ray diffraction (XRD) pattern shows at least one intensive peak ranging from about 0.5 to about 3.0° in 2θ, indicating a mesoporous structure that is retained without collapse. In general, pore sizes are reduced by about 10% to about 20% and surface areas are reduced by about 15% to about 35% after calcination.

Nitrogen adsorption may be utilized to determine the surface area and porosity of the aluminum oxide composition of the present invention. Preferably, the BET method (developed by Brunauer, Emmett and Teller), which is based upon the physical adsorption of nitrogen within the pores, is utilized. The aluminum oxide composition of the present invention preferably has an average surface area (as determined by BET ($N_2$)) ranging from about 180 to about 900 $m^2/g$, preferably from about 200 to about 700 $m^2/g$. The aluminum oxide composition of the present invention generally possesses a narrow pore size distribution center ranging from about 1.5 to about 20 nm and a pore volume ranging from about 0.3 to about 2.5 $cm^3/g$.

Nitrogen adsorption and desorption data on the resulting aluminum oxide may be obtained by using instruments available in the art (for example Micrometrics ASAP 2010) which instruments are also capable of producing a plot of the derivative of pore volume as a function of the pore diameter. Such plots to determine mesopore volume and diameter may be generated by the methodology described in E. P. Barrett, L. S. Joyner and P. P. Halenda, *J. Am. Chem. Soc.*, 73, 373-380 (1951).

Preferably, the composition of the present invention possesses a nitrogen or Argon adsorption-desorption isotherm with a step between the relative pressure ($P/P_o$) between about 0.2 and about 0.9 and at least one hysteresis loop, meaning at least having one type of pores. In one embodiment of the invention, the pore size distribution of materials produced in the present invention is such that a pore size distribution curve of the derivative of pore volume (dV) as a function of pore diameter is such that at a point in the curve that is half the height thereof (one-half of the maximum pore volume), the ratio of the width of the curve (the difference between the maximum pore diameter and the minimum pore diameter at the half height) to the pore diameter at the maximum height of the plot (as hereinabove described) is no greater than about 30 nm. In general, the width of the mesopore peak at half-height is no greater than about 20 nm and generally no greater than about 12 nm.

NMR, such as $^{27}Al$ NMR, may be conducted to characterize the aluminum in the resulting structure. Magic-Angle Spinning (MAS) may be used with $^{27}Al$ NMR to produce high resolution NMR spectra. In one embodiment. $^{27}Al$ NMR of the material produced in accordance with the present invention shows the presence of both four- and six-coordinated aluminum, and the existence of five-coordinated aluminum in the resulting structure in varying amounts, depending on the synthesis conditions.

The material of this invention may be used as absorbents, molecular sieves, catalysts and catalyst supports. The material possesses the capability to remove some trace compounds, e.g. hydrocarbons, and bases such as nitrogen-containing compounds in gas or liquid streams, and also may purify the gas or liquid streams. It may also separate some compounds from others based on the adsorption and desorption characteristics of these compounds. It may also take advantage of its framework-confined mesopores to separate some compounds from others, based-on molecular sizes.

The material of the present invention provides a good alternative for use as a catalyst support due to its high surface area, controlled pore size, and large pore volume. For example, various metals can be supported on this mesoporous aluminum oxide in the form of metal atoms or clusters, which may be catalytically active sites. It may also support metal oxides, sulfides, and oxysulfides. They can be used as catalysts for hydrotreating including denitrogenation, demetallization, desulfurization, deoxygenation, hydrofinishing, hydrogenation of olefins, hydrogenation of aromatics, hydrogenation of diolefins, hydrogenation of acetylenes, saturation, dehydrogenation, hydrocracking, CCR or RCR reduction, fluidized catalytic cracking, catalytic reforming of naphtha, steam reforming of methane, isomerization, amination, Diels-Alder reaction and Fischer-Tropsch catalysis. Alumina itself also can be used as catalysts such as for dehydration and the Claus process. In one embodiment, the mesoporous aluminum oxide of the present invention contains five-coordinated aluminum, which is strongly acidic. This mesoporous aluminum oxide may be especially useful as a catalyst. In one embodiment, the five-coordinated aluminum ranges from about 0 to about 30%, preferably less than about 20%, of the total aluminum in the aluminum oxide composition.

One aspect of this invention deals with an improved catalytic process for the demetalation and desulfurization of petroleum oils, preferably those residual fractions with undesirably high metals and/or sulfur and/or nitrogen contents and/or Conradson Carbon Residue (CCR) or Ramsbottom Carbon residue (RCR). More particularly, this invention relates to a hydrotreating process for reducing high metals, sulfur and nitrogen contents and CCR of petroleum oils, again preferably those containing residual hydrocarbon components.

Residual petroleum oil fractions are produced by atmospheric or vacuum distillation of crude petroleum: they generally contain high amounts of metals, sulfur, nitrogen and CCR content. This comes about because practically all of the metals and CCR present in the original crude remain in the residual fraction, and a disproportionate amount of sulfur and nitrogen in the original crude oil also remains in that fraction. Principal metal contaminants are nickel and vanadium, with iron and small amounts of copper also sometimes present.

The high metals, sulfur, nitrogen, and CCR content of the residual fractions generally limit their effective use as charge stocks for subsequent catalytic processing such as catalytic cracking and hydrocracking. The metal contaminants deposit on the special catalysts for these cracking processes and cause the premature ageing of the catalyst and/or unwanted side reactions such as cracking to coke, dry gas and hydrogen. During the FCC process, much of the sulfur ends up in the FCC catalyst's coke, which is burned during regeneration, resulting in substantial $SO_x$ emissions. Another major destination of the residua's sulfur is in the final cracked products, such as gasoline and light cycle oil (a blending component for diesel fuel and home heating fuel). Some of the nitrogen contributes to $NO_x$ emissions, and some nitrogen (the basic nitrogen compounds) becomes bound to the active sites of the FCC catalyst and renders it ineffective. CCR, a measure of a molecule's tendency to coke rather than crack and/or distill, is also an undesirable property for charge streams processed by catalytic cracking. Under the high temperature employed in catalytic cracking, molecules high in CCR thermally and/or catalytically degrade to coke, light gases, and hydrogen. Catalytic cracking is generally done utilizing hydrocarbon charge stocks lighter than residual fractions, which generally have an API gravity less than 20. The most common, cracking charge stocks are coker and/or crude unit gas oils, vacuum tower overheads, etc., the feedstock having an API gravity from about 15 to about 45. Since these cracking charge stocks are distillates, they do not contain significant proportions of the large molecules in which the metals are concentrated. Such cracking is commonly carried out in a reactor operated at a temperature of about 425 to 800° C., a pressure of about 1 to 5 atmospheres, and a space velocity of about 1 to 1000 WHSV.

Metals and sulfur contaminants would present similar problems in hydrocracking operations that are typically carried out on charge stocks even lighter than those charged to a cracking unit. Typical hydrocracking reactor conditions consist of a temperature of 200 to 550° C. and a pressure of 700 to 20,000 kpa.

It is evident that there is considerable need for an efficient method to reduce the metals and/or sulfur and/or nitrogen and/or CCR content of hydrocarbons, and particularly of residual petroleum fractions. While the technology to accomplish this for distillate fractions has been advanced considerably, attempts to apply this technology to residual fractions generally fail due to very rapid deactivation of the catalyst, primarily by metals contaminants and coke deposition.

As noted above, various metals such as Si, Ga, B, P, S, La, Ce, Ti, Fe, Ni, Mo, Co, Cr, Mg, Zn, Sn, V, W, Ru, Pt, P, In, Mn and Cu can substitute Al in the framework. This way, the chemical and physical properties of the resulting aluminum oxide can be tailored to meet specific requirements. The substitution will change the affinity of guest molecule(s) with the materials and consequently change the adsorption capability of the guest molecules. Moreover, the substitute may be a catalytically active species and may give some unique catalytic activity for some desired processes. In one embodiment, the molar ratio of substituted elements to Al in the aluminum oxide composition of the present invention can range from about 0.001 to about 0.6, preferably less than about 0.5.

In addition, active components of heterogeneous catalysts such as zeolites may be incorporated into or supported on the composition of this invention. Homogeneous catalyst components such as enzymes, organometallic reagents and poly acids may be supported on the composition of this invention. Furthermore, the composition of this invention may be modified using some organic functional groups (e.g. methyl, ethyl, amino, hydroxyl and thiol groups) to change surface properties of the composition, such as achieving hydrophobicity.

Some features of the aluminum oxide composition of the present invention, which are improvements over those found in the prior art, include: (a) continuously adjustable mesoporosity (including pore sizes ranging from about 1.5 to about 20 nm, pore volumes ranging from about 0.3 to about 2.5 $cm^3/g$, and specific surface areas ranging from about 180 to about 900 $m^2/g$, preferably from about 180 to about 700 $m^2/g$), by simply heating the synthesis gel after drying; (b) three-dimensionally, randomly connected mesopores; (c) enhanced thermal stability to about 900° C.; and (d) the inclusion of five-coordinated alumina.

The following examples are intended to illustrate, but not to limit, features of the invention. Examples 20 and 24 are set forth below for the purpose of comparison and are not themselves examples of the invention, but rather demonstrate by way of comparison the superiority of the invention.

In the examples below, X-ray diffraction patterns were recorded using CuKα radiation on a Philips PW 1840 diffractometer equipped with a graphite monochrometer. HRTEM images were obtained on a Jeol JEM-2010 microscope operated at 200 kV. $N_2$ isotherms were measured on a Micromeritics ASAP 2010 at 87K. Mesopore sizes were calculated using the Barrett-Joiner-Halender (BJH) model based on desorption branch. Surface areas were determined by the BET method. $^{27}$Al MAS NMR spectra were obtained using a Varian-400 s spectrometer.

EXAMPLE 1

Sixty-five (65) parts by weight of isopropanol and 85 parts of ethanol were added to a vessel with 53 parts of aluminum isopropoxide. After stirring at 50° C. for about 4 hours, 50 parts of tetraethylene glycol (TEG) were added drop-wise while stirring. After stirring for another 4 hours, 10 parts of water together with 20 parts of isopropanol and 18 parts of ethanol were added under stirring. After half an hour of stirring, the mixture became a white suspension, which was then aged at room temperature for 48 hours, and then dried in air at 70° C. for 20 hours, to obtain a solid gel. This solid gel was heated in a pressurized, heated vessel at 160° C. for 2.5 hours and finally calcined at 600° C. for 6 hours in air to produce mesoporous aluminum oxide.

Figure 2:
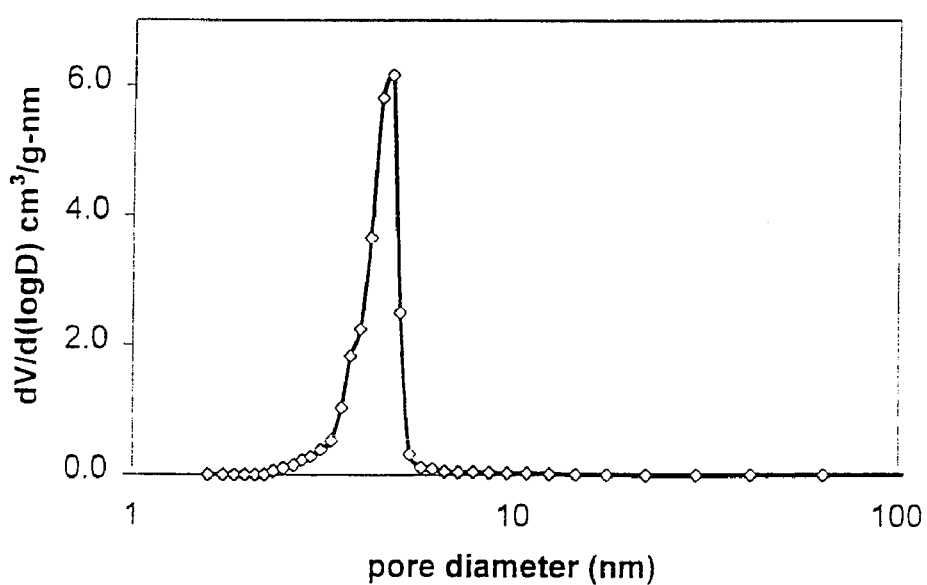
FIG. 2 is a plot of pore size distribution reflecting the derivative of pore volume as a function of pore diameter for the mesoporous alumina produced in Example 1.
Figure 3:
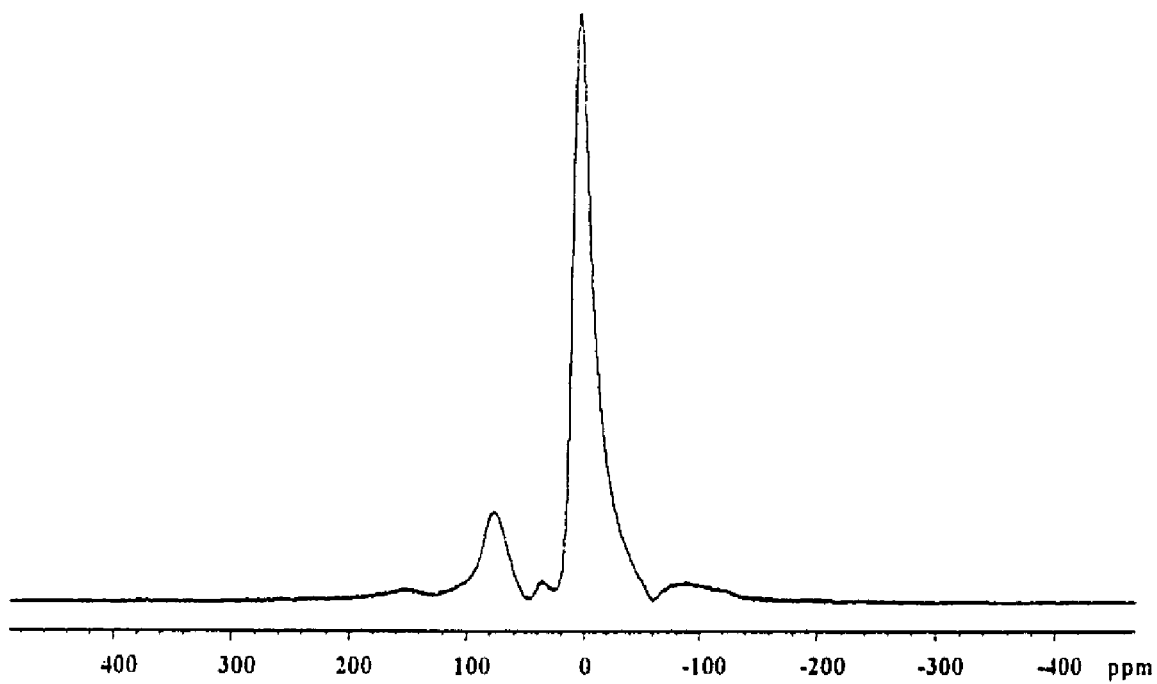
FIG. 3 is a spectrum obtained after running a $^{27}$Al NMR on the mesoporous alumina produced in Example 1.

FIG. 1 shows the XRD pattern of the resulting calcined mesoporous aluminum oxide. There is an intensive peak around 1.6° in 2, characteristic of meso-structured materials. FIG. 2 shows the pore size distribution narrowly centered around 4.6 nm. FIG. 3 presents the $^{27}$Al NMR spectroscopy, showing three peaks corresponding to four-, five- and six-coordinated aluminum at 75, 35 and 0 ppm, respectively. This is a typical mesoporous material of the present invention with four-, five- and six-coordinated aluminum.

EXAMPLES 2-6

The same synthesis mixture of Example 1 was prepared, aged and dried under the same conditions as described above in Example 1. The dried gel was then divided into five parts, and each part was transferred into a separate pressurized, heated vessel. These five pressurized vessels were heated at 160° C. for 3, 4.75, 6.25, 8.0 and 10 hours. respectively, corresponding to Examples 2, 3, 4, 5, and 6. Finally the samples were calcined at 600° C. for 6 hours in air.

Table 1 below shows the mesoporosity of the materials based on nitrogen adsorption. It is clear that mesopore sizes increase with the time of heating, whereas surface areas decrease. In this way, the mesoporosity can be easily tailored.

TABLE 1

Tuning mesoporosity of aluminum oxide by heating the dried gel in autoclaves.

| Example | Heating time (hr) | Surface area (m$^2$/g) | Average pore size (nm) | Pore volume (cm$^3$/g) |
|---|---|---|---|---|
| 2 | 3 | 431 | 4.7 | 0.62 |
| 3 | 4.75 | 429 | 5.1 | 0.65 |
| 4 | 6.25 | 421 | 5.3 | 0.67 |
| 5 | 8 | 410 | 5.4 | 0.67 |
| 6 | 10 | 381 | 5.7 | 0.69 |

Figure 4:
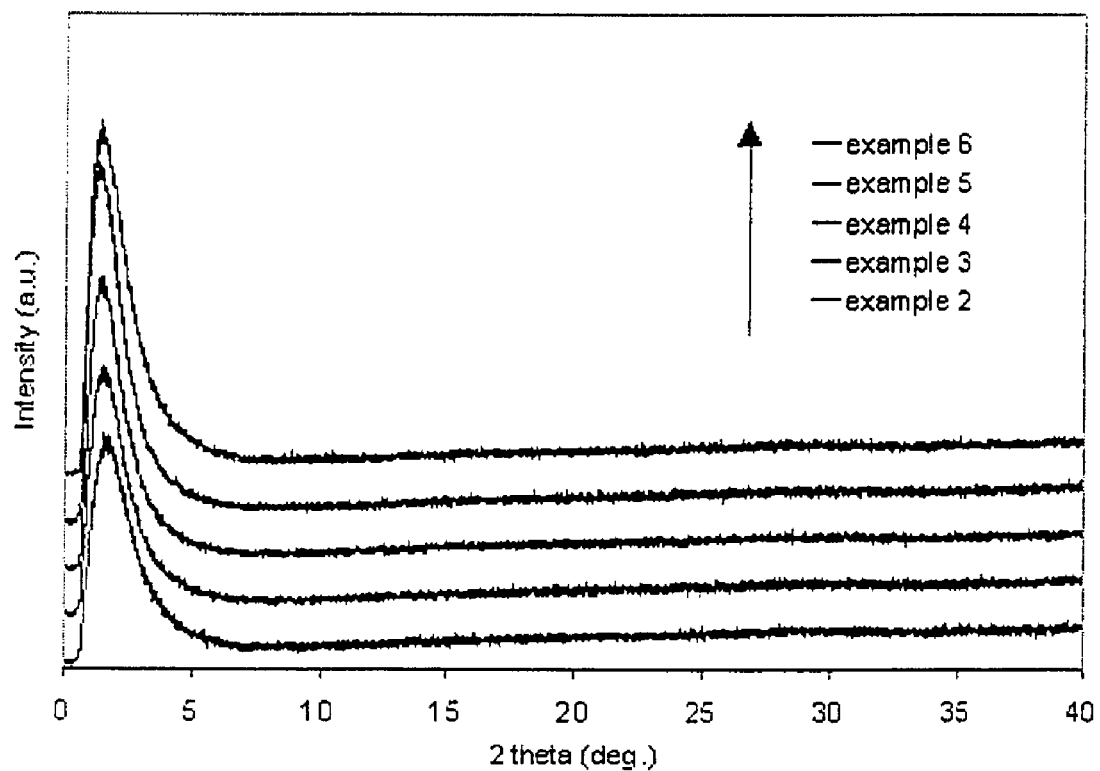
FIG. 4 is the X-ray diffraction patterns of the mesoporous alumina produced in Examples 2-6.
Figure 5:
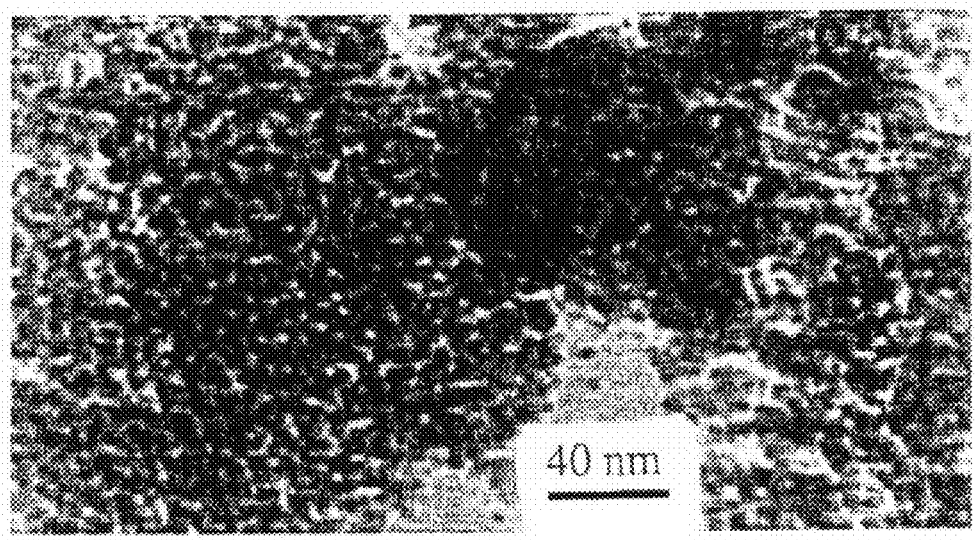
FIG. 5 is a transmission electronic microscopy (TEM) image of the mesoporous alumina produced in Example 3.

FIG. 4 shows the XRD patterns of the materials of Examples 2-6. FIG. 5 shows the TEM image of aluminum oxide produced in Example 3. It shows a foam-like or sponge-like pore structure with randomly connected mesopores. It is similar to the image of siliceous TUD-1 (as described in U.S. Pat. No. 6,358,486), which has been shown using carbon replica to be a three-dimensional pore structure.

EXAMPLES 7-10

The same synthesis mixture of Example 1 was prepared, aged and dried under the same conditions as Example 1. The dried gel was then divided into four parts and each part was transferred into a separate pressurized, heated vessel. These four pressurized vessels were heated at 120° C. for 4, 6, 11 and 15 hours, respectively, corresponding to Examples 7, 8, 9, and 10. Finally the samples were calcined at 600° C. for 6 hours in air.

Table 2 below shows the mesoporosity of the materials based on nitrogen adsorption.

TABLE 2

Tuning mesoporosity of aluminum oxide by heating the dried gel in autoclaves.

| Example | Heating time (hr) | Surface area (m$^2$/g) | Average pore size (nm) | Pore volume (cm$^3$/g) |
|---|---|---|---|---|
| 7 | 4 | 472 | 4.0 | 0.61 |
| 8 | 6 | 468 | 4.2 | 0.60 |
| 9 | 11 | 389 | 6.2 | 0.71 |
| 10 | 15 | 386 | 18 | 1.7 |

Figure 6:
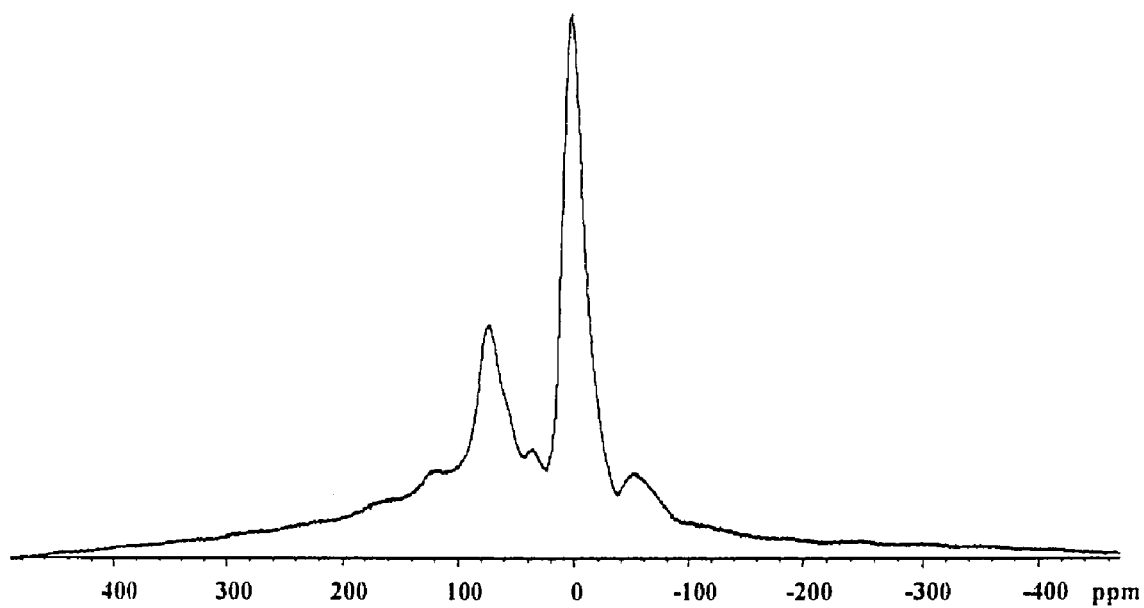
FIG. 6 is a spectrum obtained after running a $^{27}$Al NMR on the mesoporous alumina produced in Example 8.

Table 2 shows again that the mesoporosity of the materials can be tuned by varying the heating time. Compared to Examples 2-6, it is clear that heating at lower temperatures in the pressurized, heated vessel led to higher surface areas in the resulting i materials. FIG. 6, a spectrum obtained by a $^{27}$Al NMR on the mesoporous alumina produced in Example 8, shows five-coordinated aluminum at 36 ppm, together with four- and six-coordinated aluminum at 78 and 5 ppm, respectively.

EXAMPLE 11

Sixty (60) parts by weight of isopropanol and 90 parts of ethanol were added to a vessel with 55 parts of aluminum isopropoxide. After stirring at 60° C. for 3 hours, 53 parts of tetraethylene glycol (TEG) was added while stirring. After stirring for another 2 hours, 9 parts of water together with 36 parts of isopropanol and a few droplets (0.5 parts) of sulphuric acid were added while stirring. The mixture immediately formed a thick white gel, which was aged at room temperature for 12 hours, and then dried in air at 70° C. for 7 hours. This solid dried gel was heated in a pressurized, heated vessel at 120° C. for 4 hours and calcined at 600° C. for 6 hours in air to produce mesoporous aluminum oxide.

Figure 7:
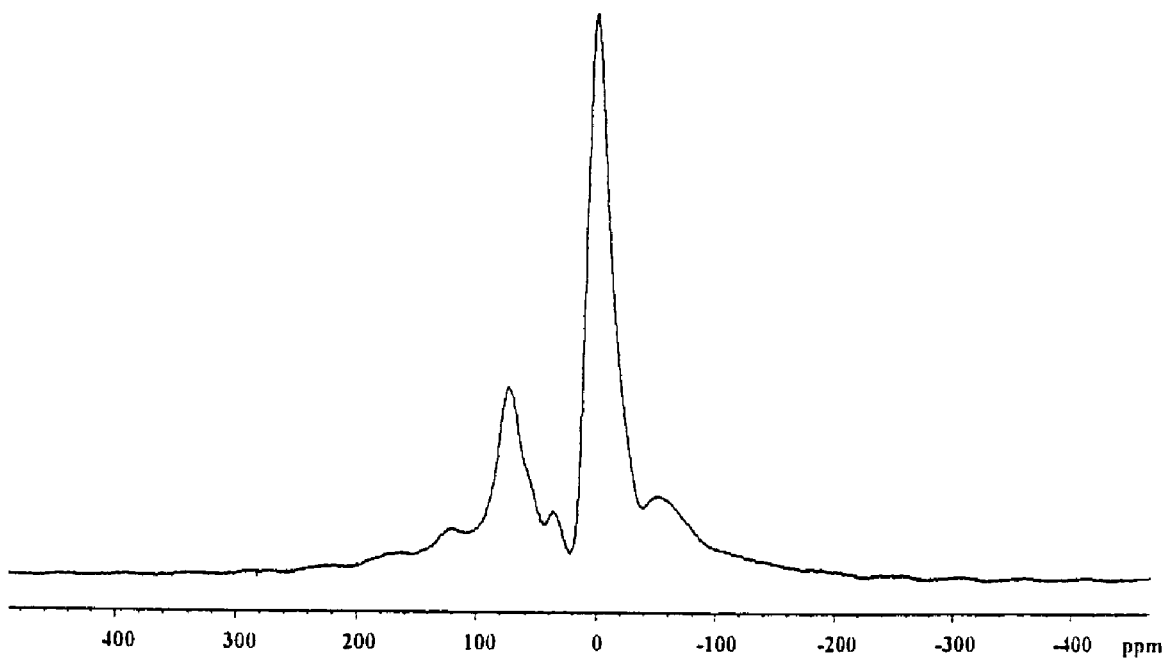
FIG. 7 is a spectrum obtained after running a $^{27}$Al NMR on the mesoporous alumina produced in Example 11.

The XRD pattern of the resulting-mesoporous aluminum oxide presented the characteristics of meso-structured materials. Nitrogen adsorption revealed a high surface area of about 528 m$^2$/g and a narrow pore size distribution around 4 nm. FIG. 7 shows the $^{27}$Al NMR spectroscopy of the material of Example 11, showing three peaks corresponding to four-, five- and six-coordinated aluminum at 78, 36 and 1.5 ppm, respectively.

EXAMPLE 12

Sixty(60) parts by weight of isopropanol was added to a vessel with 28 parts of aluminum isopropoxide. After stirring at 50° C. for 3 hours, 26 parts of tetraethylene glycol (TEG) was added while stirring. After stirring for another 2 hours, 5 parts of water together with 10 parts of isopropanol were added while stirring. The resulting mixture immediately formed a white suspension, which was then aged at room temperature overnight, and then dried in air at 65° C. for 7 hours. This solid gel was heated in an autoclave at 190° C. for 6 hours and finally calcined at 600° C. for 6 hours in air.

Nitrogen adsorption showed a high surface area of 375 m$^2$/g, pore diameter of 8.2 nm, and pore volume of 0.91 cm$^3$/g.

EXAMPLE 13

Twenty-seven (27) parts by weight of water was added to 21 parts of Al$_2$(SO$_4$)$_3$·18 H$_2$O under stirring. After 15 minutes of stirring, 16 parts of TEG was added to the above mixture followed by the addition of 8 parts of NaOH under stirring, and a gel immediately formed. After the mixture was aged for one day, it was separated into two layers. The bottom layer (white gel) was collected and dried at 98° C. for one day and calcined at 550° C. for 6 hours in air. The powder was then washed using demineralized water until no SO$_4^{2-}$ was detected in the liquid and then dried at 60° C.

Figure 8:
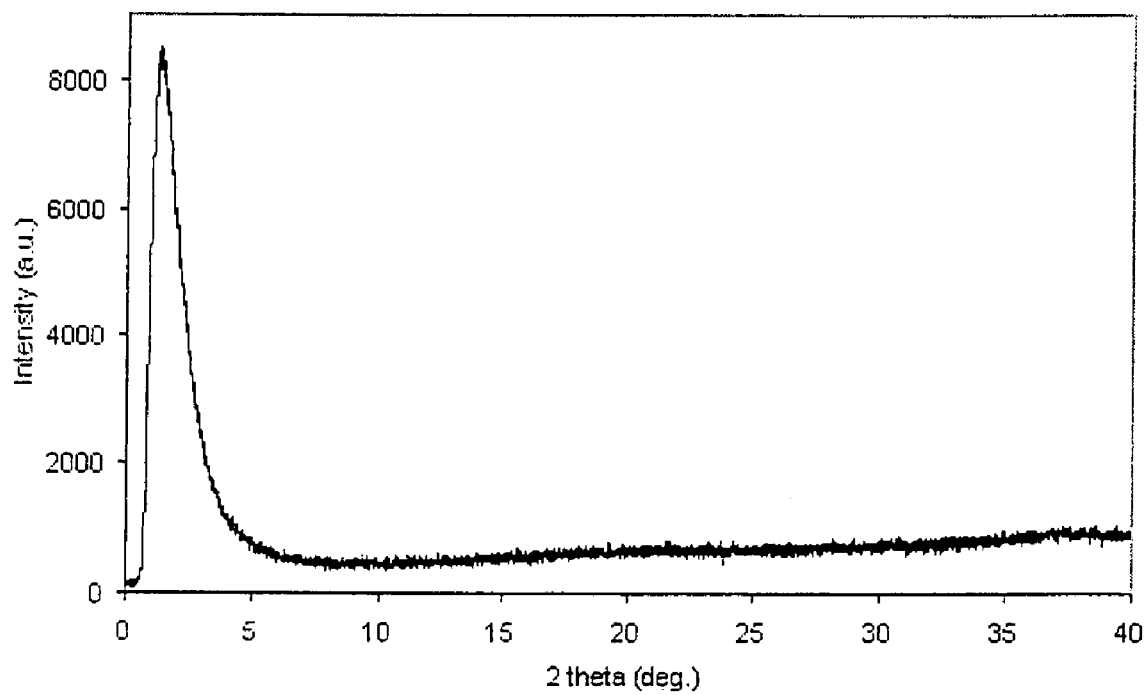
FIG. 8 is the X-ray diffraction pattern of the mesoporous alumina produced in Example 13.

FIG. 8, the XRD pattern of the resulting alumina, shows an intensive peak characteristic of a meso-structured material. Nitrogen adsorption showed a specific surface area of 450 m$^2$/g, a pore volume of 1.1 cm$^3$/g, and an average pore diameter of 6.2 nm.

EXAMPLE 14

Thirty-two (32) parts by weight of water was added to 28 parts of Al(NO$_3$)$_3$·9H$_2$O under stirring. After 15 minutes of stirring, 15 parts of TEG was added to the above mixture while stirring. After stirring for about one hour, 13 parts of NH$_4$OH (28-30 wt. % NH$_3$) was added under stirring and a thick gel immediately formed. After the mixture was aged for one day, it was dried at 98° C. for one day and calcined at 550° C. for 6 hours in air.

Figure 9:
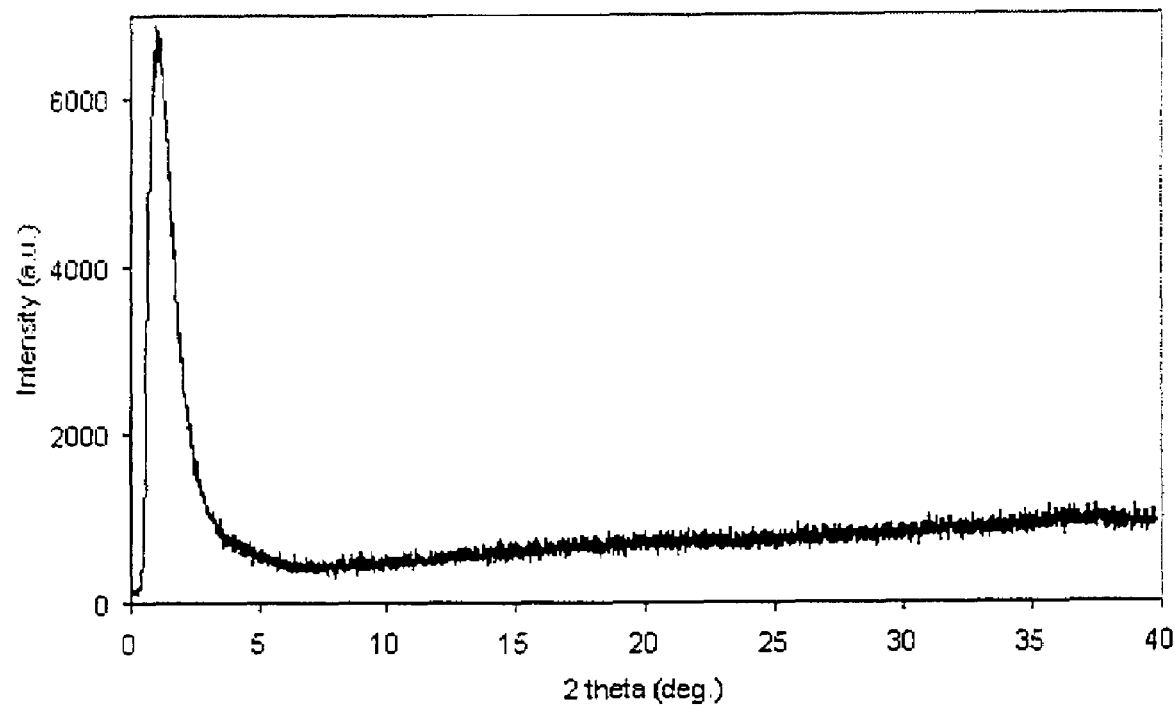
FIG. 9 is the X-ray diffraction pattern of the mesoporous alumina produced in Example 14.
Figure 10:
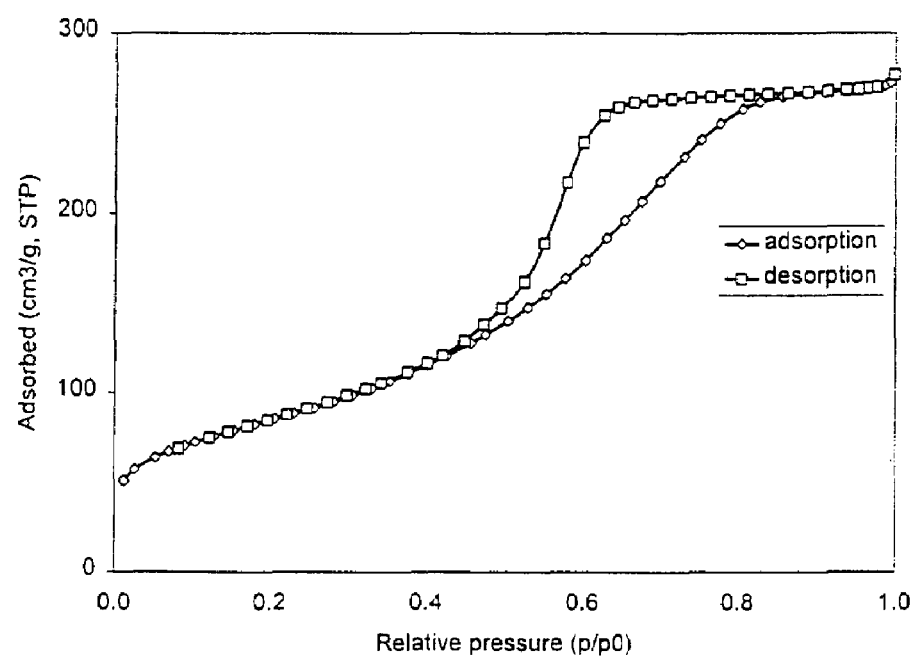
FIG. 10 is a graph of the nitrogen adsorption and desorption isotherms for the mesoporous alumina produced in Example 14.
Figure 11:
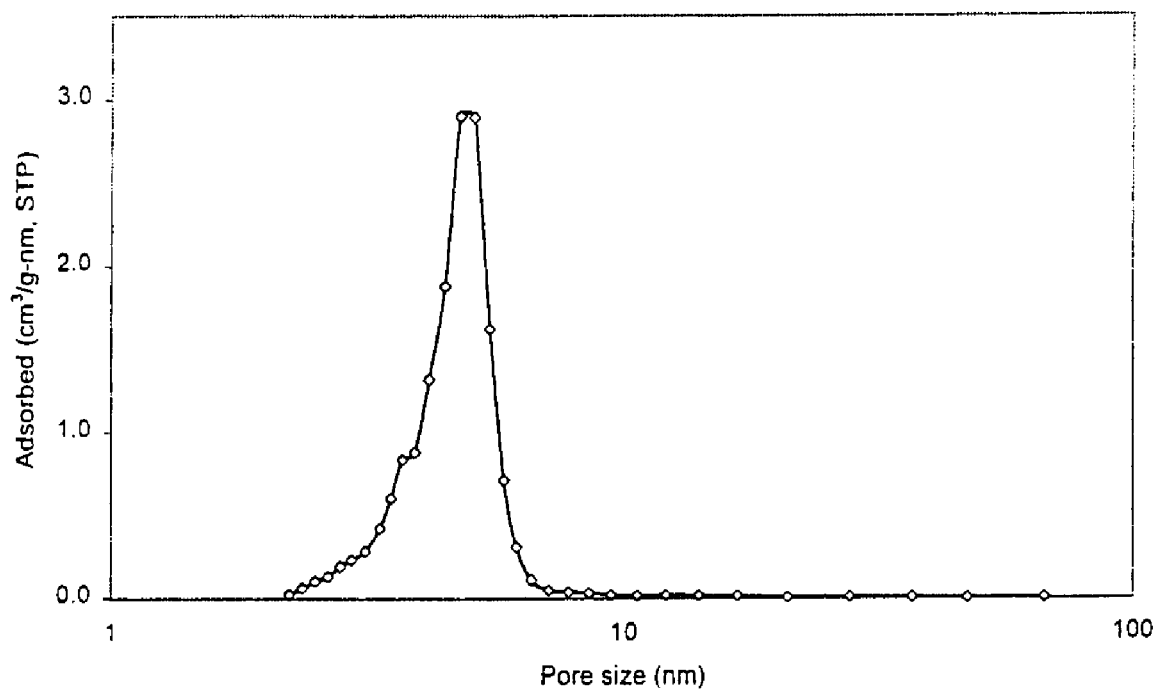
FIG. 11 is a plot of the pore size distribution reflecting the pore volume as a function of pore diameter for the mesoporous alumina produced in Example 14.
Figure 12:
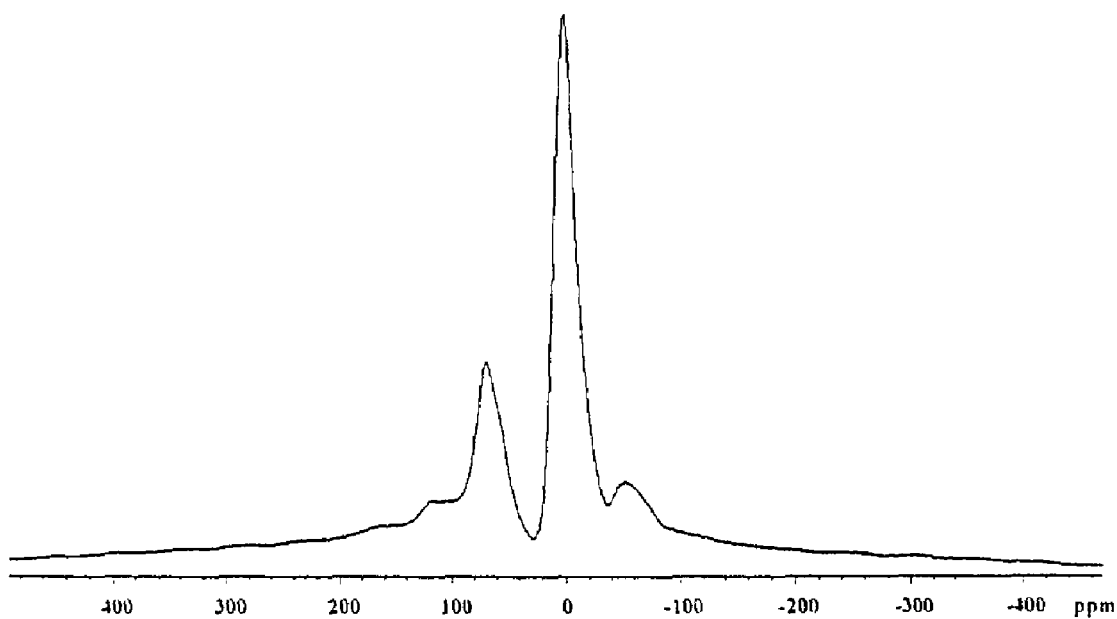
FIG. 12 is a spectrum obtained after running a $^{27}$Al NMR of the mesoporous alumina produced in Example 14.

FIG. 9, the XRD pattern of the resulting alumina, shows an intensive reflection at a lower angle in 2θ, presenting the characteristics of a meso-structured material. FIG. 10 shows nitrogen adsorption isotherms with a step between the relative pressure of 0.2 and 0.9 (P/Po), and FIG. 11 shows the pore size distribution. This material had a surface area of 306 m$^2$/g, pore volume of about 0.43 cm$^3$/g and pore size distribution centered around 4.8 nm in diameter. FIG. 12 is the $^{27}$Al NMR spectrum for the resulting alumina showing 4- and 6-coordinated alumina corresponding to peaks at 75 ppm and 7.5 ppm, respectively.

EXAMPLE 15

This example shows the preparation of Ti-containing alumina TUD-1. Twelve (12) parts of isopropanol and 20 parts of ethanol were added to a mixture of 25 parts of aluminum isopropoxide and 1 part of titanium n-butoxide. After stirring at 50° C. for about 4 hours, 23 parts of tetraethylene glycol (TEG) were added while stirring. After stirring for another 2 hours, 4 parts of water together with 10 parts of isopropanol and 15 parts of ethanol were added under stirring. After 30 minutes of additional stirring, the mixture became a white suspension, which was then aged at room temperature for 24 hours, then dried in air at 98° C. overnight to form a solid gel. This solid gel was then calcined at 600° C. for 6 hours in air.

Figure 13:
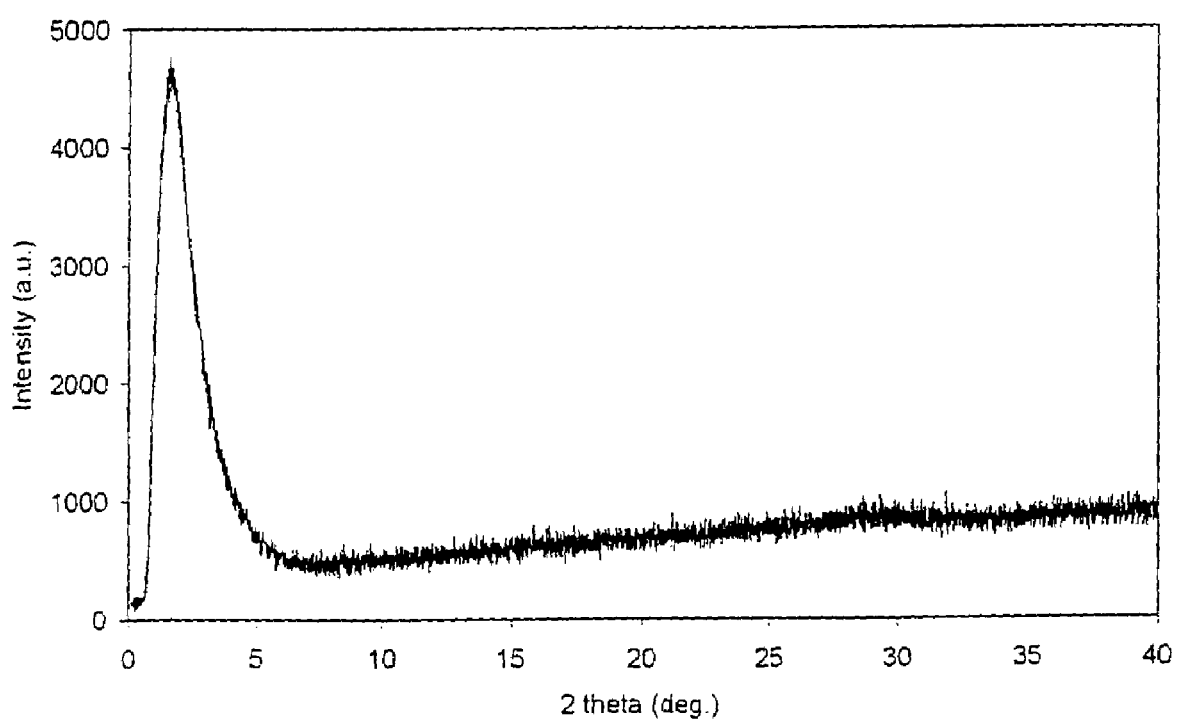
FIG. 13 is the X-ray diffraction pattern of the mesoporous alumina produced in Example 15.

FIG. 13, the XRD pattern of this material, shows an intensive peak at a low angle, characteristic of a meso-structured material. The XRD pattern lacks an extra peak at high angle, indicating no titanium oxide phases were detected. Elemental analysis showed that Ti/Al molar ratio is 0.25. Nitrogen adsorption showed a high surface area of 478 m$^2$/g, a pore volume of 0.98 cm$^3$/g and a mesopore size distribution centered around 2.3 nm.

EXAMPLE 16

Ten (10) parts of isopropanol and 18 parts of ethanol are added to a mixture of 25 parts of aluminum isopropoxide and 6 part of tetraethyl orthosilicate. After stirring at 50° C. for about 2 hours, 22 parts of triethanolamine (TEA) are added while stirring. After stirring for another 2 hours, 10 parts of water together with 10 parts of isopropanol and 12 parts of ethanol are added under stirring. After 30 minutes of additional stirring, the mixture become a white suspension, which is then aged at room temperature for 22 hours, then dried in air at 96° C. overnight to form a solid gel. This solid gel is then calcined at 600° C. for 10 hours in air.

The XRD pattern of this material, shows an intensive peak at a low angle, characteristic of a meso-structured material. Elemental analysis shows that Si/Al molar ratio is 0.21. Nitrogen adsorption shows a high surface area of 588 m$^2$/g, a pore volume of 1.1 cm$^3$/g and a mesopore size distribution centered around 2.5 nm.

EXAMPLE 17

This example demonstrates the use of this invention composition as a catalyst Support for hydrogenation. First, 3.13 parts of the material obtained in Example 15 is impregnated with 2 parts of 3.1 wt. % Pt(NH$_3$)$_4$(NO$_3$)$_2$ aqueous solution by the incipient wetness method. After drying and calcination in air at 350° C. for 2 hours, 50 mg of impregnated catalyst is loaded in to the reactor, then reduced with hydrogen at 300° C. for 2 hours.

Hydrogenation of mesitylene is carried out in a fixed bed reactor under a total pressure of 6 bars and having a feed with a mesitylene concentration of 2.2 mol % in hydrogen by saturation. In order to measure catalyst activity, the reaction temperatures is varied in the range of 100 to 130° C. in steps of 10° C. The modified contact time based on the mass of catalyst is kept constant at 0.6 $g_{cat.}$*min*1$^{-1}$. The first order reaction rate constants based on the catalyst mass is 0.15 $g_{cat.}^{-1}$*min$^{-1}$*1 at 100° C. with an activation energy of 30 kcal/gmole of mesitylene.

EXAMPLE 18

This example demonstrates the dehydration of 1-phenyl-ethanol to styrene. Al-TUD-1, as prepared in Example 12, is tabulated, sieved into 16-20 Tyler mesh, and then loaded into a plug flow micro-reactor with ½" O.D. Total catalyst volume is about 20 cc in the reactor. The test conditions are at a total pressure of 1 bar and a temperature of 300±5° C. The feed rate of 1-phenyl-ethanol is kept at 30 g/hr. The outlet stream of the micro-reactor is liquefied by condensation, and the liquid samples (two phases) are analyzed by gas chromatographic (GC) method. Catalytic activity and product selectivity are determined from GC data. After 10 hr on stream, it shows a conversion of 98.2% and a selectivity of 97.9%.

EXAMPLE 19

Here demetallation is performed using a base metal-promoted Al-TUD-1. One (1) part of Al-TUD-1 prepared in Example 12 is impregnated with one part of an aqueous solution having 9 wt % of antimony paramolybdate and 2 wt % of nickel nitrate. The impregnated Al-TUD-1 is dried at 110° C. for 4 hr and then calcined in air at 500° C. for 3 hr to obtain a hydrotreating catalyst.

The hydrotreating of heavy hydrocarbon oil is carried out in a 200 cc-volume shaking autoclave. Twenty (20) grams of prepared catalyst and 100 g of Kuwait vacuum resid (containing 43 ppm Ni, 149 ppm V, 5.0 wt. % S and 9.0 wt % asphaltenes) are loaded into the autoclave. Hydrogen is used to flush the inner atmosphere for three times. The autoclave is heated up to 410° C. and then hydrogen is fed into the autoclave to maintain 150 bars pressure. During the reaction the autoclave has a shaking rate of 60 strokes per minute. After 3 hr the demetallation extent is 88% based on total amount of Ni and V.

EXAMPLE 20

This is a comparative example to Example 19. A commercial γ-$Al_2O_3$ having an average pore diameter of 12 nm, BET surface area of 205 $m^2$/g and total pore volume of 0.53 cc/g is used as a catalyst carrier to prepare a demetallation catalyst. The catalyst preparation procedures and catalyst test conditions are the same as that in Example 19. After 3 hr the demetallation extent is 79% based on total amount of Ni and V, lower than that of using the present invention Al-TUD-1 as a catalyst carrier. While not wishing to be bound by any particular theory, one major difference between Al-TUD-1 and commercial γ-$Al_2O_3$ is the high surface area of the Al-TUD-1. One of the major unique features of Al-TUD-1 is its ability to be made at high surface areas.

EXAMPLE 21

This example demonstrates the application of catalyst in dehydrogenation. Al-TUD-1, as prepared in Example 12, is impregnated with an aqueous solution of stannic chloride to obtain homogeneously distributed tin on Al-TUD-1. The impregnated Al-TUD-1 is then calcined at 600° C. for 2 hr and 1050° C. in air for 1. hr. The calcined Al-TUD-1 is then impregnated with a chloroplatinic acid solution and a potassium hydroxide solution. After the second impregnation, the Al-TUD-1 is treated in an oven at 500° C. for 4 hr in the presence of 3% steam and chlorine-containing gases, followed by reduction in hydrogen at 550° C. for about 2 hr. The finished Al-TUD-1 catalyst contains 0.44 wt % platinum, 1.0 wt % potassium and 0.2 wt % tin.

This catalyst is tested in a catalyst test unit to dehydrogenate propane to produce propylene. The operating conditions includes a hydrogen to propane mole ratio of 0.4, a liquid hourly space velocity (LHSV) of 30 $hr^{-1}$, a pressure of 0.35 bar and a reaction temperature of 655° C. After 10 hr on stream, the propane conversion is approximately 32%.

EXAMPLE 22

This example demonstrates the steam reforming of methane using mesoporous Al-TUD-1 as a support prepared according to the present invention. AL-TUD-1, as prepared in Example 14, is further calcined in air at 1100° C. for 6 hr. An aqueous solution having ruthenium trichloride, magnesium nitrate, cobalt nitrate and zirconium oxychloride is impregnated into the above calcined Al-TUD-1 with a liquid/solid weight ratio of 3/10. The impregnated Al-TUD-1 is then dried at 120° C. and calcined at 500° C. for 2 hr to obtain a finished catalyst. Elemental analysis shows that it contains 5.3% $ZrO_2$, 2.1% MgO, 0.5% Ru and 1.1% Co by weight.

The above catalyst of 1 cc is loaded into a quartz tube reactor with an I.D. of ¾", and then in-situ reduced under hydrogen stream at 500° C. for 2 hr (GHSV of hydrogen: 6000 $hr^{-1}$). After reduction, propane and steam are introduced under the following conditions: reaction temperature 550° C., GHSV of propane 6000 $hr^{-1}$ and steam/carbon ratio of 3. The outlet as is analyzed by gas chromatographic (GC) analysis. Propane conversion is calculated based on the carbon number. The total carbon number is the sum of CO, $CO_2$, $CH_4$, ($C_2H_4+C_2H_6$)×2 and ($C_3H_6+C_3H_8$)×3, while unconverted carbon number is $C_3H_6$×3. The propane conversion is approximately 93%.

EXAMPLE 23

This example demonstrates the application of silica-containing alumina TUD-1 in Diels-Alder reaction. In a stainless steel reactor are placed 867 parts of crotonaldehyde and 87 parts of silica-containing alumina TUD-1 prepared in Example 16. followed by stirring at 60° C. In a flask, 861 parts of dicyclopentadiene is added dropwise to 100 g of a mineral oil heated to 250° C. over 10 hr to produce cyclopentadiene, and this cyclopentadiene is continuously added dropwise to the above-mentioned mixture of crotonadehyde and silica-alumina to carry out reaction.

Next, the stirring of the reaction mixture is stopped and the silica-alumina catalyst is then allowed to precipitate, and the supernatant is drawn to obtain 1.627 parts of a reaction mixture solution comprising 97 wt % of a desired product. i.e. 2-formyl-3-methylbicycl[2,2,1]hepta-5-ene, 2 wt % of cyclopentadiene and 1 wt % of crotonaldehyde. The selectivity of 2-formyl-3-methylbicyclo[2,2,1]hepta-5-ene is 98% on the basis of crotonaldehyde.

EXAMPLE 24

This is a comparative example to Example 23. The same reaction as in Example 23 is carried out without catalyst under the same conditions. However, the selectivity of 2-formyl-3-methylbicyclo[2,2,1]hepta-5-ene is 76% on the basis of crotonaldehyde, lower than that using Al-TUD-1 as catalyst in Example 23.

EXAMPLE 25

In this Example the present composition is used as a catalyst for phenol amination with ammonia. The material obtained in Example 16 is loaded into a central portion of a reaction tube with an O.D. of 1 inch and a length of 6 feet. The reactor is heated up to 380° C. while passing ammonia gas through. Phenol is fed using a micropump after the temperature reaches 380° C. The reaction is carried out at a pressure of 15 bars in the presence of ammonia. The feed rate of phenol is 0.045 $hr^{-1}$ in terms of LHSV, and the ammonia to phenol molar ratio is 15.

The liquid phase of the reaction product is collected, and then a certain amount of methanol is added to cause the two immiscible phases to become one while sampling. The liquid sample is injected into a gas chromatography apparatus for conversion and selectivity determination.

A continuous operation is conducted for about 4 days, and the phenol conversion reaches 99.7 and phenol selectivity 98.7%.

EXAMPLE 26

This example demonstrates using the composition of the invention as a catalyst for hydrotreating of a FCC clarified slurry oil. For catalyst preparation, Al-TUD-1 obtained in Example 12 and a commercial γ-$Al_2O_3$ mentioned in Example 20 are used as catalyst supports.

These two supports are first impregnated with an ammonium heptamolybdate solution. Particularly, 45 parts of an aqueous solution containing 6.4 parts of ammonium heptamolybdate is added to 38 parts of the above material. The resulting wet material is dried at 120° C. and calcined in air at 538° C. under conditions sufficient to decompose ammonium heptamolybdate and generate $MoO_3$, thereby producing a molybdenum impregnated material.

The molybdenum-impregnated material is then impregnated with a nickel nitrate solution. Particularly, 48.2 parts of an aqueous solution containing 8.0 parts of $Ni(NO_3)_2 \cdot 6H_2O$ is added to the molybdenum-impregnated material. The resulting wet material is dried at 121° C. and then calcined in air at 538° C. to decompose nickel nitrate and generate NiO, thereby producing a nickel and molybdenum impregnated catalysts.

Their activities for hydrotreating are evaluated using FCC clarified slurry oil as feedstock. Table 3 shows the properties of the feedstock.

TABLE 3

(Properties of FCC clarified slurry oil)

| | |
|---|---|
| Gravity, °API | 1.3 |
| CCR, Wt. % | 8.68 |
| Hydrogen, Wt. % | 7.90 |
| Sulfur, Wt. % | 0.96 |
| Nitrogen, Wt. % | 0.46 |

These two catalysts are presulfided for a period of 1 hour in a 500 $cm^3$/min flow of 10% $H_2S$ in $H_2$ at 230° C. and a total pressure of 680 kPa. Hydrotreating is conducted at a temperature of 415° C., a pressure of 138 bars, a hydrogen flow rate of 500 $cm^3$/min, a liquid hour space velocity of about 0.5. Table 4 shows the comparison of activity in terms of denitrogenation, Conradson Carbon Residue (CCR) reduction, and desulfurization.

TABLE 4

Comparison of hydrotreating activity

| Catalyst | This invention | Commercial $\gamma$-$Al_2O_3$ |
|---|---|---|
| Denitrogenation (%) | 64 | 55 |
| CCR reduction (%) | 65 | 52 |
| Desulfurization (%) | 91 | 87 |

The catalyst of this invention shows much higher activity, which partially should be attributed to its unique pore structure and high surface area.

It will be understood that various modifications may be made to the embodiments disclosed herein. Therefore, the above description should not be construed as limiting, but merely as exemplifications of preferred embodiments. For example, varying the aluminum source, the pore-forming agent, and the heating time can all be used to adjust the mesopore size of the resulting aluminum oxide. Those skilled in the art will envision other modifications within the scope and spirit of the claims appended hereto.

What is claimed is:

1. A process for treating organic compounds which comprises:
   a) providing a mesoporous aluminum oxide comprising one X-ray diffraction peak where 2θ is between about 0.3° to about 3.5°, wherein mesopores in said composition range from about 1.5 nm to about 20 nm in diameter and the said mesopores randomly interconnected, and have a pore volume ranging from about 0.3 $cm_3$/g to about 2.5 $cm_3$/g, wherein the mesoporous structure has optionally incorporated therewith at least about 0.02% by weight of at least one catalytically and/or chemically active heteroatom selected from the group consisting of Si, Ti, V, Cr, Zn, Fe, Sn, Mo, Ga, Ni, Co, In, Zr, Mn, Cu, Mg, Pd, Ru, Pt, W and combinations thereof or zeolites, wherein the mesoporous aluminum oxide is provided by
   i. dissolving at least one inorganic source of aluminum oxide in a solvent to obtain a mixture;
   ii. adding at least one non-surfactant pore forming agent to the mixture, said pore forming agent being capable of hydrogen bonding without forming miscelles;
   iii. adding at least one alkali to the mixture;
   iv. drying the mixture at a temperature ranging from about 40° C. to about 140° C. for a period of time ranging from about 1 hour to about 48 hours to obtain a dried gel; and,
   v. removing the pore-forming agent from the dried gel to obtain a powder comprising the mesoporous aluminum oxide;

b) contacting feed under reaction conditions with said catalyst wherein the treating process is selected from the group consisting of catalytic reforming, steam reforming, fluid catalytic cracking, hydrotreating, CCR reduction, RCR reduction, isomerization, hydration, dehydration, hydrogenation, dehydrogenation, denitrogenation, demetallation, desulfurization, sulfur recovery including the Claus process, Fischer-Tropsch synthesis, ammoxidation, amination, Diels-Alder synthesis and adsorption.

2. The process of claim 1 wherein the treating process is catalytic reforming of naphtha, the feed comprises at least one hydrocarbon of the gasoline boiling range, and operating conditions comprise a pressure of from about 1 bar to 60 bars, a liquid hourly space velocity of from about 0.2 to 20 $hr^{-1}$, and an operating temperature of from about 350° to 560° C.

3. The process of claim 1 wherein the treating process is steam reforming, the feed comprises at least one hydrocarbon, and an operating temperature of from about 700° to 1200° C.

4. The process of claim 1 wherein the treating process is Fischer-Tropsch synthesis, the feed comprises at least carbon monoxide and hydrogen, and operating conditions comprise a pressure of from about 3 bars to about 60 bars, and an operating temperature of from about 190° C. to about 400° C.

5. The process of claim 1 wherein the treating process is dehydration, the feed comprises at least one alcohol, and operating conditions comprise a pressure of from about 0.1 bar to 10 bar, and an operating temperature of from about 100° C. to about 300° C. for liquid phase dehydration and 210° to about 330° C. for gas phase dehydration.

6. The process of claim 1 wherein the treating process is hydrocracking, the feed comprises at least one hydrocarbon, and operating conditions comprise a pressure of from about 40 bars to 200 bars, a liquid hourly space velocity of from about 0.2 $hr^{-1}$ to about 6 $hr^{-1}$, an operating temperature of from about 250° C. to about 550° C., and a hydrogen/hydrocarbon volume ratio of from about 200 to about 1000.

7. The process of claim 1 wherein the treating process is hydrotreating, the feed comprises at least one hydrocarbon, and operating conditions comprise a pressure of from about 3 bars to 240 bars, a liquid hourly space velocity of from about 0.05 $hr^{-1}$ to 25 $hr^{-1}$, and an operating temperature of from about 200° C. to 700° C.

8. The process of claim 1 wherein the treating process is amination, the feed comprises at least one hydrocarbon and one amination agent, and operating conditions comprise a pressure of from about 5 bars to about 50 bars, a liquid hourly space velocity of from about 0.01 hr$^{-1}$ to 2 hr$^{-1}$, an operating temperature of from about 300° to 550° C., and an amination agent/hydrocarbon molar ratio of from about 1 to about 40.

9. The process of claim 1 wherein the treating process is hydrogenation, the feed comprises at least one unsaturated hydrocarbon, and operating conditions comprise a pressure of from about 5 bars to 120 bars, a liquid hourly space velocity of from about 1000 hr$^{-1}$ to about 30,000 hr$^{-1}$, and an operating temperature of from about 25° C. to 300° C.

\* \* \* \* \*